United States Patent
Rajanna

(10) Patent No.: US 12,258,043 B2
(45) Date of Patent: Mar. 25, 2025

(54) SYSTEMS AND METHODS FOR PERFORMING REMEDIAL ACTION WHILE A WIRELESS NETWORK OF A VEHICLE IS COMPROMISED

(71) Applicant: Adeia Guides, Inc., San Jose, CA (US)

(72) Inventor: Vasanthraj Rajanna, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/505,138

(22) Filed: Oct. 19, 2021

(65) Prior Publication Data
US 2023/0118478 A1    Apr. 20, 2023

(51) Int. Cl.
| | |
|---|---|
| *B60W 60/00* | (2020.01) |
| *B60W 50/14* | (2020.01) |
| *G01C 21/34* | (2006.01) |
| *H04W 4/021* | (2018.01) |
| *H04W 4/024* | (2018.01) |
| *H04W 4/40* | (2018.01) |
| *H04W 12/122* | (2021.01) |
| *H04W 76/30* | (2018.01) |
| *G06F 3/04842* | (2022.01) |
| *H04W 84/00* | (2009.01) |

(52) U.S. Cl.
CPC ........ *B60W 60/0015* (2020.02); *B60W 50/14* (2013.01); *B60W 60/0053* (2020.02); *G01C 21/3461* (2013.01); *H04W 4/021* (2013.01); *H04W 4/024* (2018.02); *H04W 4/40* (2018.02); *H04W 12/122* (2021.01); *H04W 76/30* (2018.02); *B60W 2540/215* (2020.02); *B60W 2556/45* (2020.02); *G06F 3/04842* (2013.01); *H04W 84/005* (2013.01)

(58) Field of Classification Search
None
See application file for complete search history.

(56) References Cited

U.S. PATENT DOCUMENTS

| | | | |
|---|---|---|---|
| 2017/0215045 A1* | 7/2017 | Rasal | G01S 5/0054 |
| 2018/0234446 A1* | 8/2018 | Conner | H04W 4/48 |

FOREIGN PATENT DOCUMENTS

| | | | |
|---|---|---|---|
| CN | 113347635 | * | 9/2021 |

* cited by examiner

*Primary Examiner* — Hongye Liang
(74) *Attorney, Agent, or Firm* — Haley Guiliano LLP

(57) ABSTRACT

Systems and methods are described for receiving a user selection indicating that a wireless network of a vehicle has been compromised; in response to receiving the user selection, causing the vehicle to be disconnected from the compromised wireless network; and while the vehicle is disconnected from the compromised wireless network performing a remedial action to enable the vehicle to navigate from a current location of the vehicle to a safe location.

16 Claims, 7 Drawing Sheets

SYSTEMS AND METHODS FOR PERFORMING REMEDIAL ACTION WHILE A WIRELESS NETWORK OF A VEHICLE IS COMPROMISED

BACKGROUND

This disclosure is directed to systems and methods for performing a remedial action when a wireless network of a vehicle is compromised. In particular, techniques are disclosed for disconnecting a vehicle from a wireless network in response to receiving a user selection indicating that a wireless network of a vehicle has been compromised, and performing the remedial action while the vehicle is disconnected from the compromised wireless network.

SUMMARY

Many vehicles on the road are capable of connecting to a wireless network and providing a variety of features to drivers and occupants of a vehicle using information received via the network. For example, many autonomous or semi-autonomous vehicles are capable of connecting to a wireless network to receive and transmit data in order to enable a vehicle to drive at least partially on its own. While network-connected vehicles offer many benefits, networks are vulnerable to cyberattacks by bad actors, which may compromise the network of the vehicle. If such network is compromised, there is a risk not only of damage to the vehicle but also of personal harm to occupants of the vehicle and others.

In one approach, a potential cyberattack may be identified by analyzing network traffic. However, there may be instances where the system does not detect any abnormalities in network traffic, but the user nonetheless observes that his or her vehicle is behaving irregularly. In this instance, if the user is in a situation where he or she cannot easily pull over or stop the vehicle, he or she may have no mechanism of disconnecting the vehicle from the potentially compromised network and no way to otherwise thwart the cyberattack. Moreover, even if the system flags network traffic as abnormal, the system may lack the capability or features needed to rectify the situation and effectively communicate to the user what actions should be taken.

To overcome these problems, systems and methods are provided herein for receiving a user selection indicating that a wireless network of a vehicle has been compromised, and in response to receiving the user selection, causing the vehicle to be disconnected from the compromised wireless network. While the vehicle is disconnected from the compromised wireless network, a remedial action to enable the vehicle to navigate from a current location of the vehicle to a safe location is performed.

Such aspects provide a user (e.g., a driver or occupant of a vehicle) with a mechanism to proactively communicate to a vehicle that a wireless network of a vehicle has been compromised. Accordingly, even if the system of the vehicle determines that the wireless network of the vehicle is not compromised, the user may initiate remedial action to cause the vehicle to be navigated to a safe location, such as if the user recognizes that certain components of the vehicle are functioning abnormally, e.g., suggesting a unauthorized entity may be impacting the functioning of the vehicle. Thus, a potentially dangerous situation of a vehicle being remotely taken over by a bad actor, which may cause harm to occupants of the vehicle, other drivers or pedestrians, can be avoided.

In some embodiments, the user selection corresponds to receiving input associated with a physical switch positioned in the vehicle. In some embodiments, the user selection corresponds to receiving input associated with a graphical user interface of the vehicle or a graphical user interface of a user device.

In some aspects of this disclosure, performing the remedial action comprises determining, using locally stored navigation data, a driving route from the current location of the vehicle to the safe location, and causing, using control circuitry disconnected from the compromised wireless network, the vehicle to travel along the determined driving route from the current location to the safe location.

In some embodiments, performing the remedial action comprises communicating, over a different network than the compromised wireless network, with a network-connected device within a predefined vicinity of the vehicle to notify the network-connected device that the wireless network of the vehicle has been compromised, and causing, using control circuitry disconnected from the compromised wireless network, the vehicle to navigate from the current location of to the safe location based on instructions received from the network-connected device.

In some aspects of this disclosure, the compromised wireless network is one of a plurality of networks associated with the vehicle, and communicating, over the different network than the compromised wireless network, with the network-connected device comprises identifying a network of the plurality of networks that is determined to be unlikely to be compromised, and performing the communicating with the network-connected device over the identified network.

In some embodiments, communicating, over the different network than the compromised wireless network, with the network-connected device is performed based on a user profile of a user positioned within the vehicle.

In some aspects of this disclosure, communicating, over the different network than the compromised wireless network, with the network-connected device is performed with another vehicle.

In some embodiments, the vehicle is in an autonomous driving mode, and performing the remedial action comprises generating for presentation a notification instructing a user to manually operate the vehicle.

In some aspects of this disclosure, the provided systems and methods further comprise determining that a wireless network of a vehicle has been compromised based on inbound signals from an external network causing an unexpected change in functionality of the vehicle, and providing a notification to the user indicating that the wireless network of the vehicle has been compromised.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
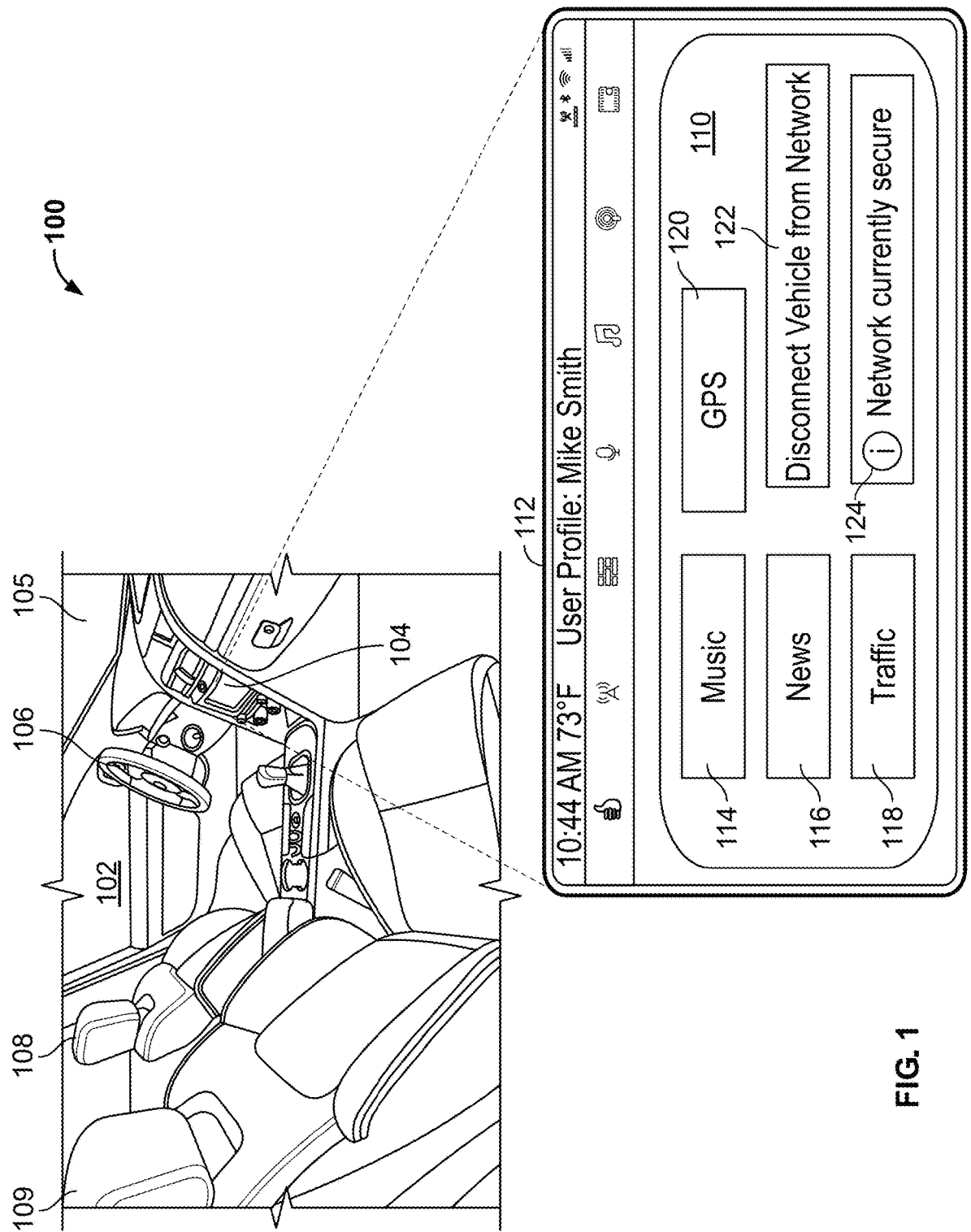
FIG. 1 shows an illustrative vehicle interior configured to receive a user selection indicating that a wireless network of a vehicle has been compromised, in accordance with some embodiments of this disclosure.

FIG. 1 shows an illustrative interior 102 of a vehicle 100 configured to receive a user selection indicating that a wireless network of a vehicle has been compromised, in accordance with some embodiments of this disclosure. An interior 102 of vehicle 100 may comprise display 104, front windshield 105, steering wheel 106, driver seat 108, passenger seat 109, and any suitable number of other components. Vehicle 100 may correspond to any suitable vehicle, e.g., a car, motorcycle, boat, airplane, helicopter, drone, bus, truck, etc. In some embodiments, vehicle 100 may be capable of operating as an autonomous or semi-autonomous vehicle, which may be understood as any vehicle that can be configured to guide itself without human intervention during at least a portion of a navigation session.

A vehicle security application (e.g., executing on one or more processors located at least in part at vehicle 100; and/or a mobile device within a vicinity of vehicle 100; and/or one or more remote servers, such as in a cloud server configuration, in communication with vehicle 100) may be configured to cause user interface 110 to be generated for display at display 104. In some embodiments, display 104 may be a dashboard display (e.g., provided at a center of vehicle or in a vicinity of driver seat 108) and/or a heads-up display provided at windshield 105 of vehicle 100. Vehicle 100 may be configured to be connected to one or more wireless networks (e.g., a cellular network, a Wi-Fi network, a satellite network, short-range communication networks such as, for example, Bluetooth, NFC, RFID, any suitable RF communications protocol, or any combination thereof).

User interface 110 may provide an indication of user profile 112 associated with an operator or occupant of vehicle 100, may permit access of content (e.g., music, in response to receiving selection of option 114; news, in response to receiving selection of option 116; traffic, in response to receiving selection of option 118), and may permit access to other features provided by vehicle 100, e.g., driving directions, accessible by selecting option 120 associated with a Global Positioning System (GPS) module.

User interface 110 may comprise a selectable option 122 to enable an occupant of vehicle 100 to instruct the vehicle security application to cause vehicle 100 to be disconnected from one or more wireless (and/or wired) networks. In some embodiments, selectable option 122 may comprise a plurality of options, for each of the one or more wireless networks that vehicle 100 is connected to, to selectively disconnect respective networks, and/or an option to disconnect vehicle 100 from all networks. In some embodiments, selectable option 122 may enable an occupant of vehicle 100 to disconnect vehicle 100 from one or more wireless networks of vehicle 100, such as if the occupant recognizes that vehicle is behaving abnormally, e.g., the occupant observes that one or more doors of vehicle 100 cannot be unlocked; the engine cannot be started; audio provided via an infotainment system of vehicle 100 cannot be raised above a certain volume threshold or lowered below a certain volume threshold; a command to turn on a vehicle air conditioning system acts as a command to turn on a heating system, or vice versa; a vehicle speedometer is not functioning properly, such as, for example, showing an error message; a change in speed occurs that is not expected by the vehicle operator or occupant, etc. In some embodiments, selectable option 122 can be a user interface element, or a physical button or switch or other mechanical component. In some embodiments, selectable option 122 can correspond to, e.g., a start/stop button, where an SOS mode may be activated by repeatedly pressing the start/stop button for a predefined number of times (e.g., 3 times). In some embodiments, in the SOS mode, the vehicle may be configured to turn on parking lights, hazard lights, etc.

In some embodiments, the vehicle security application may cause a wireless network status indicator 124 to be generated for display at user interface 110, based on a determination (e.g., made by the vehicle by analyzing network traffic) of whether one or more wireless networks of vehicle 100 may be compromised. In some embodiments, wireless network status indicator 124 may comprise a plurality of identifiers for each respective wireless network of vehicle 100 and a corresponding indication of whether such wireless network is determined to be currently compromised. In some embodiments, selectable option 122 and/or status indicator 124 may be provided to a user device (e.g., a mobile phone, which may be running a mobile application corresponding to the vehicle security application) of an occupant of vehicle 100, additionally or alternatively to providing selectable option 122 and/or status indicator 124 at user interface 110 of interior 102 of vehicle 100. In some embodiments, even if status indicator 124 indicates that there are no issues with one or more wireless networks of vehicle 100, option 122 may be selected based on the vehicle occupant's observations, to initiate remedial action by the vehicle security application.

In some embodiments, in determining a status indicator to be specified as status indicator 124, the vehicle security application may determine that one or more wireless networks of vehicle 100 may be compromised, e.g., in response to detecting an irregularity associated with a particular wireless network, such as, for example, based on comparing current wireless network conditions over a particular network to historic wireless network conditions. For example, a table of historic wireless network conditions may be stored in a database (e.g., locally at vehicle 100 or remote from vehicle 100) in association with whether such conditions correspond to an instance of a wireless network being compromised. In some embodiments, status indicator 124, as well as option 122, may be specified at any suitable level of granularity. For example, status indicator 124 may indicate that a first wireless network (e.g., cellular network) is compromised, whereas a second wireless network or technique (e.g., Bluetooth) is not compromised, and user interface 110 may receive user selection of option 122 to disconnect the first network, but may not receive selection of an option to disconnect the second network.

Status indicator 124 may represent an indication or suggestion to one or more occupants of vehicle 100 whether to disconnect from one or more wireless networks of vehicle 100 (e.g., whether the occupant should select option 122), or may be used to automatically disconnect from certain wireless networks. In some embodiments, such recommendations may be based, at least in part, on user profile indicated at 112, which may store an indication of a user's vehicle model, make, age and/or location. The vehicle security application may query a database (e.g., database 505 of FIG. 5) indicating historical instances where a network was compromised in a vehicle having similar attributes, and may suggest the user select option 122 (or automatically cause option 122 to be selected) in response to determining that similar vehicles experienced a cyberattack with respect to similar issues that vehicle 100 is experiencing. The database may comprise a plurality of user profiles indicating instances when other users selected option 122, and base recommendations made via indicator 124 data contained in such plurality of other user profiles.

In response to determining that vehicle 100 has been disconnected from one or more wireless networks (e.g., based on receiving a user selection of selectable option 122) the vehicle security application may cause one or more remedial actions to be performed while the vehicle is disconnected from the compromised wireless network. For example, selection of option 122 may cause vehicle 100 to enter an SOS mode in which the vehicle security application enables vehicle 100 to navigate from a current location of the vehicle to a safe location. In some embodiments, the remedial action may comprise causing all vehicle components associated with enabling network connectivity of the compromised wireless network (e.g., wireless transceiver circuitry) to be disabled. On the other hand, modules of vehicle 100 not associated with network connectivity of the compromised wireless network may not be impacted by such remedial action. In some embodiments, the remedial action may comprise, e.g., the vehicle security application overriding a locked state of a door in connection with one or doors previously having been unable to be unlocked, or overriding any other suitable irregularity in the functioning of vehicle 100.

Figure 2:
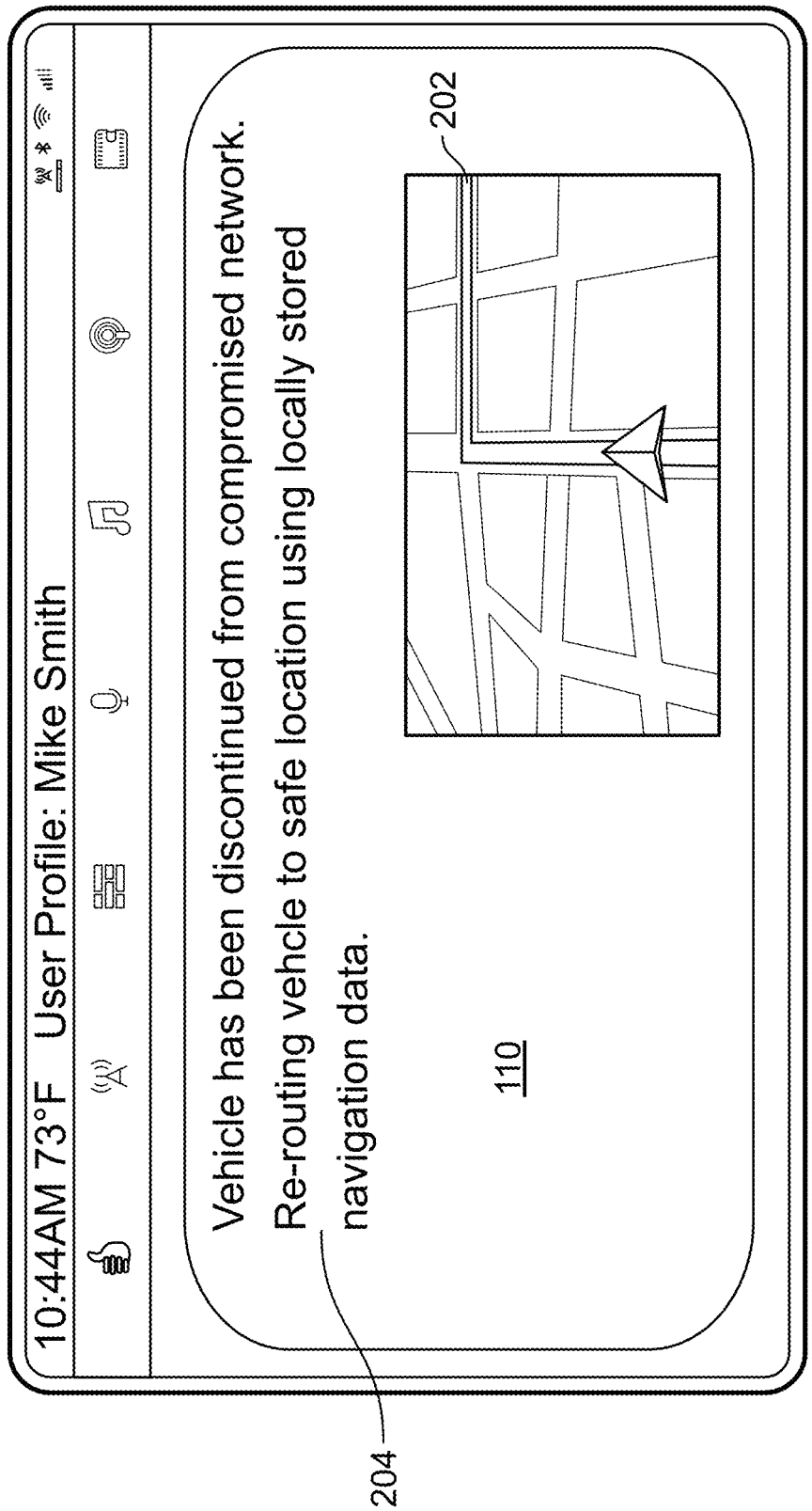
FIG. 2 shows an illustrative example of remedial action performed while a vehicle is disconnected from a compromised wireless network, in accordance with some embodiments of this disclosure.

In some embodiments, the remedial action may comprise the vehicle security application causing vehicle 100 to operate autonomously to navigate vehicle 100 from a current location to a safe location, such as shown in connection with illustrated example of FIG. 2. In some embodiments, the remedial action may comprise the vehicle security application causing a message 304 to be generated for output (e.g., via display and/or audio alerts) instructing a user to manually operate vehicle 100 (e.g., if the vehicle was previously operating in an autonomous manner which may be desirable to exit, or if the vehicle is no longer capable of operating in the autonomous manner now that the wireless network has been disconnected), and may be accompanied by providing navigation route 302 to the vehicle occupant, such as shown in connection with illustrated example of FIG. 3.

In some embodiments, the remedial action may comprise providing a navigation route to navigate vehicle 100 from a current location to a safe location may be provided via user interface 110. In the illustrative example of FIG. 2, the navigation route indicated at 202 on user interface 110 may be the route along which vehicle 100 is to be autonomously navigated to the safe location. In the illustrative example of FIG. 3, the navigation route indicated at 302 on user interface 110 is the route along which vehicle 100 may be manually operated to the safe location. In each of the examples of FIGS. 2 and 3, the navigation may be provided and executed without the assistance of the compromised, now-disconnected wireless network. Instead, the vehicle security application may perform such remedial actions based on one or more of a last known location of vehicle 100 (e.g., prior to vehicle 100 being disconnected from the compromised wireless network); locally stored (e.g., cached) data (e.g., navigation data, object identification data); local computing modules; data received via an uncompromised wireless network of vehicle 100; and/or data received via a mobile device positioned within vehicle 100. In some embodiments, processing for such autonomous navigation and/or GPS navigation route may be performed locally at vehicle 100 by control circuitry having been disconnected from the compromised wireless network as a result of the selection of option 122. In some embodiments, a description 204, 304 of the remedial action being taken may be provided via user interface 110. In some embodiments, the user may be provided with an option to decline to perform the remedial action or override the determination of vehicle 100 to perform a certain remedial action, and/or select a different remedial action to be performed by the vehicle security application.

In performing autonomous or semi-autonomous navigation, vehicle 100 may utilize any suitable combination of sensors and processing techniques. For example, vehicle 100 may comprise sensors (e.g., cameras, LiDAR, RADARs, ultrasonic, etc.) and employ computer vision techniques to sense an ambient environment surrounding vehicle 100, in order to detect obstacles and identify objects to safely operate vehicle 100. In some embodiments, image processing techniques may be performed on one or more objects detected as surrounding the vehicle to extract certain features of the one or more objects, and the vehicle security application may query a database (e.g., database 505 of FIG. 5) of known objects and corresponding features with such extracted features, to classify the type of the encountered object (e.g., another vehicle, a pedestrian, a road sign, an animal, etc.), which may be taken into account in determining how to navigate vehicle 100. In some embodiments, machine learning techniques may be employed in which machine learning models may be trained to detect the presence of, and classify, objects surrounding vehicle 100. In some embodiments, such techniques may be utilized to determine whether the environment surrounding a current location of vehicle 100 is dangerous (e.g., the middle of a highway, in the middle of an intersection, etc.) or safe (e.g., a parking lot, a driveway, an open field, etc.). If the surrounding environment is determined to be dangerous, the remedial action may correspond to enabling vehicle 100 to reach a safe location, whereas if the surrounding environment is determined to be safe, vehicle 100 may be immediately disabled or slowly brought to a stationary position, in response to being disconnected from the compromised wireless network.

Under normal circumstances where wireless networks of vehicle 100 are not compromised, vehicle 100 may be in communication with one or more remote servers, e.g., vehicle 100 may perform some processing and storage locally, and transmit data about its environment to the remote servers for storage and processing, e.g., the remote servers may be configured to have more computing power than vehicle 100, to perform processing-intensive tasks. In some embodiments, when disconnecting vehicle 100 from the compromised wireless network, communication with the remote servers may be suspended, and vehicle 100 may temporarily perform processing required for autonomous navigation locally, rather than relying on the remote servers such as in normal operating conditions, since the communication path between vehicle 100 and the remote servers may be compromised.

Figure 4:
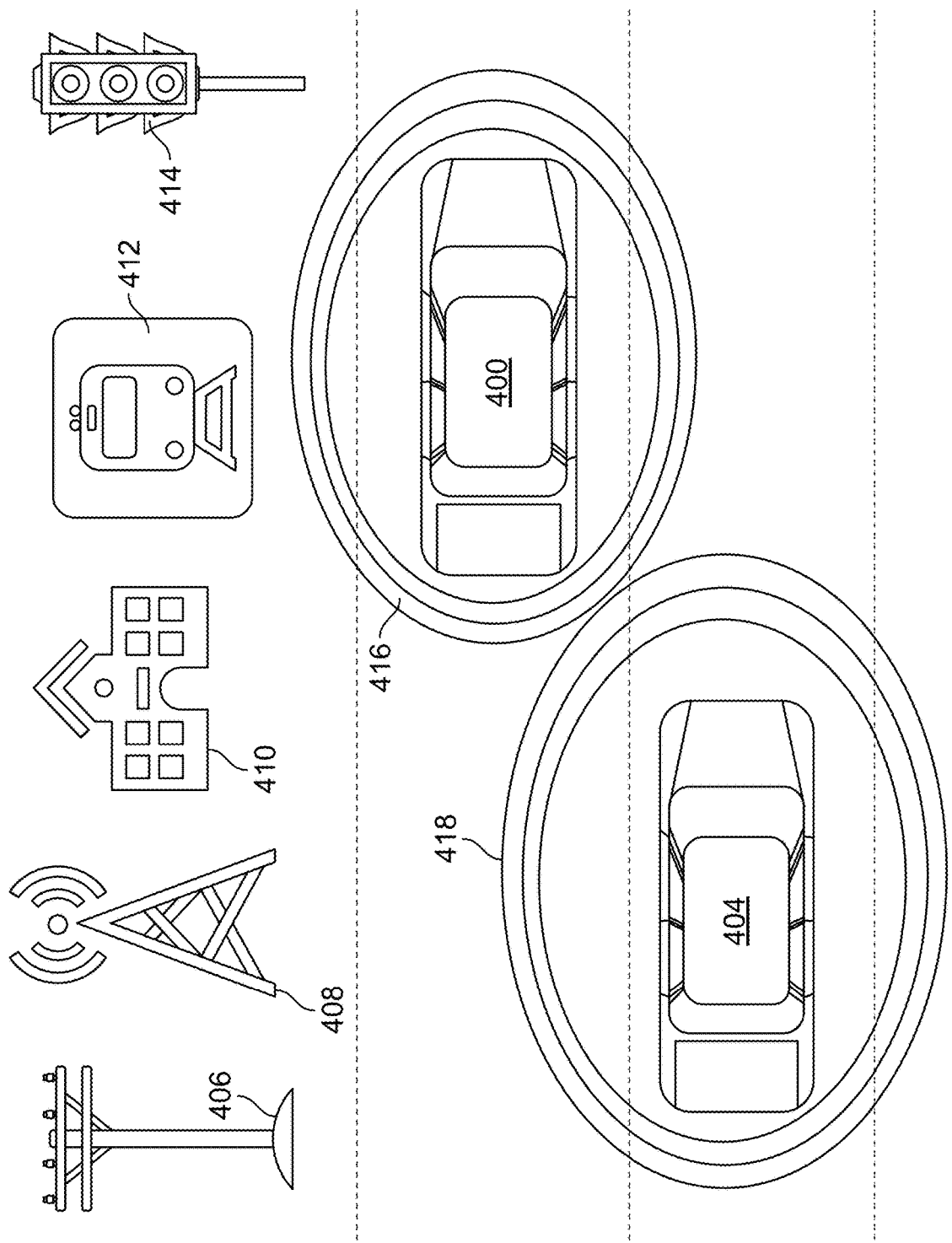
FIG. 4 shows an illustrative example of remedial action performed while a vehicle is disconnected from a compromised wireless network, in accordance with some embodiments of this disclosure.

FIG. 4 shows an illustrative example of remedial action performed while vehicle 400 is disconnected from a compromised wireless network, in accordance with some embodiments of this disclosure. Vehicle 400 may correspond to vehicle 100. In some embodiments, a remedial action performed by the vehicle security application may comprise communicating over a wireless network (determined not to be compromised, and/or not associated with the network disconnected in response to receiving selection of option 122) with nearby objects, e.g., vehicle 404, landmarks (e.g., electric grid equipment 406; telecommunications equipment 408; building 410, such as, for example a police station; transportation infrastructure 412, such as, for example, a train, train tracks, road sensors, etc.; traffic equipment 414, such as, for example, traffic lights or road signs) or any other suitable device (e.g., a mobile device within vehicle 400 or vehicle 404). For example, vehicle 400 and 404 may communicate via short-range wireless technique, or any other suitable technique, based on respective wireless signal 416 (e.g., an SOS signal) and wireless signal 418 broadcast by vehicles 400 and 404, respectively. In some embodiments, an SOS message may be broadcast by vehicle 400 over any suitable communication channel (e.g., to alert nearby vehicles, the authorities, devices at a home of the user of vehicle 400 or devices of family or friends of the user of vehicle 400) of an ongoing cyberattack of vehicle 400 and a request for assistance.

In some embodiments, a wireless network used to enable communication between vehicle 400 and one or more of vehicle 404 and landmarks 406, 408, 410, 412, 414 may be determined based on the indication received via selectable option 122. For example, if the selectable option is associated with disconnecting a first communication network (e.g., Wi-Fi) of vehicle 100, a different communications network (e.g., cellular or short-range communication, vehicle-to-vehicle communications) may be utilized for communications between vehicle 400 and one or more of vehicle 404 and landmarks 406, 408, 410, 412, 414. In some embodiments, the vehicle security application may automatically determine which alternative network is suitable for such communication, e.g., by analyzing network traffic over the candidate alternative network to ensure such network is not compromised. In some embodiments, a recommendation may be provided to an occupant of vehicle 400 concerning which network to use to carry out communications with external devices and/or recommending which external device to communicate with, and user selection of a network and/or external device may be received. In some embodiments, a selection of a network may be made at least in part based on user profile 112, which may indicate historical data concerning which external devices and/or networks were successfully employed in past instances of similar vehicles and/or in a similar geographic area to that of the driver occupant.

In some embodiments, the communication between vehicle 400 and one or more of vehicle 404 and one or more external devices (e.g., landmarks 406, 408, 410, 412, 414) may comprise receiving instructions from such one or more external devices concerning how to navigate vehicle 400 to a safe location, and/or enabling the external device to control navigation of vehicle 400 in order to bring vehicle 400 to a safe location. For example, if utilizing local processing techniques to navigate vehicle 400 to safety is determined not to be practical, or a bad actor is determined to have taken control of such processing via the compromised wireless network or a user is panicking and unable to take control of vehicle 400, it may be preferable to enable an external device to control navigation of vehicle 400. In some embodiments, a selectable option may be provided to enable a vehicle occupant to accept or reject the determination to allow an external device to instruct vehicle 400 (e.g., provide a navigation route) how to reach a safe location, or otherwise control vehicle 400 to arrive at a safe location.

In some embodiments, a mobile device of a user within vehicle 400 and/or vehicle 404 may relay instructions to vehicle 400 to enable vehicle 400 to navigate to a safe location (e.g., over a network determined not to be compromised or associated with selectable option 122 having caused vehicle 400 to be disconnected from the compromised wireless network).

In some embodiments, selectable option 122 may be provided in the context of a ridesharing or ridehailing service provider (e.g., via a mobile application of the ridesharing company running on a mobile device of a passenger of a vehicle associated with the ridesharing or ridehailing service provider). For example, if a passenger of the ridesharing vehicle observes behavior of the ridesharing vehicle indicative of a cyberattack of the vehicle, the passenger may select selectable option 122, which may cause the ridesharing vehicle to communicate (e.g., over a cellular network) with other nearby vehicles associated with the ridesharing or ridehailing service provider, in an effort to request assistance from, or obtain instructions from, such vehicles to assist the ridesharing vehicle in reaching a safe location. In some embodiments, a large-scale attack may be detected, e.g., if a certain amount of vehicles being operated by employees of, or otherwise associated with, the ridesharing or ridehailing service provider are determined to be compromised based on a plurality of indications received from passengers of such vehicles, to enable the ridesharing or ridehailing service provider to take remedial action (e.g., temporarily shut down servers associated with the ridesharing or ridehailing service provider). In some embodiments, a passenger of the ridesharing vehicle may select option 122 to cause the ridesharing vehicle to be disconnected from the compromised wireless network.

Figure 5:
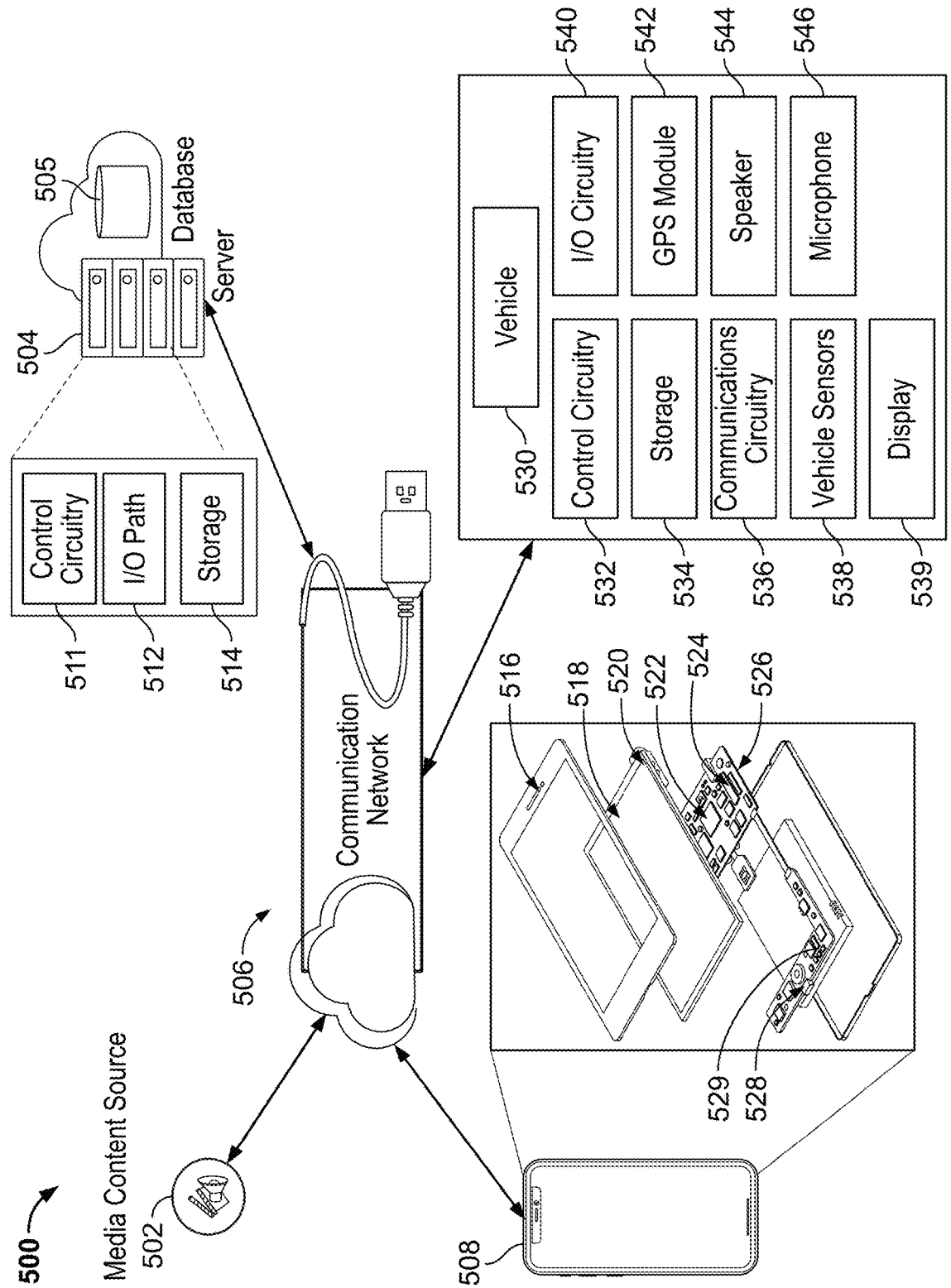
FIG. 5 is a diagram of an illustrative system for performing a remedial action while a vehicle is disconnected from a compromised wireless network, in accordance with some embodiments of this disclosure.

FIG. 5 is a diagram of an illustrative system 500 for performing a remedial action while a vehicle is disconnected from a compromised wireless network, in accordance with some embodiments of this disclosure. User equipment device 508 (e.g., which may correspond to a mobile device of an occupant or operator of vehicle 100 of FIG. 1 and vehicle 400 of FIG. 4) may be coupled to communication network 506. Communication network 506 may be one or more networks including the Internet, a mobile phone network, mobile voice or data network (e.g., a 5G, 4G, or LTE network), cable network, public switched telephone network, short-range communication network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing. Any suitable number of additional user equipment devices may be employed (e.g., a user device of an occupant or operator of vehicle 404).

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 506.

System 500 may comprise media content source 502 and server 504. In some embodiments, media content source 502 may correspond to server 504 and/or media content source 502 may correspond to server 504 may be under the control of or otherwise associated with a media content provider. In addition, there may be more than one of each of media content source 502 and server 504, but only one of each is shown in FIG. 5 to avoid overcomplicating the drawing. If desired, media content source 502 and server 504 may be integrated as one source device. In some embodiments, the vehicle security application may be executed at one or more of control circuitry 511 of server 504 and control circuitry 532 of vehicle 530 (and/or control circuitry of user equipment device 508).

In some embodiments, server 504 may include control circuitry 511 and storage 514 (e.g., RAM, ROM, Hard Disk, Removable Disk, etc.). Storage 514 may store one or more databases. Server 504 may also include an input/output path 512. I/O path 512 may provide device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 (and specifically processing circuitry thereof) to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 511 executes instructions for an emulation system application stored in memory (e.g., the storage 514). Memory may be an electronic storage device provided as storage 514 that may be part of control circuitry 511.

In some embodiments, server 504 may retrieve guidance data from media content source 502, process the data as will be described in detail below, and forward the data to user equipment device 508 and/or vehicle 530. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 602 may include cable sources, satellite providers, on-demand providers, Internet providers, over-the-top content providers, or other providers of content. Media content source 502 may also include a remote media server used to store different types of content (including audio and/or video and/or audiovisual content selected by a user), in a location remote from any of the client devices. Media content source 502 may also provide supplemental content relevant to the metadata of a particular scene of a media asset as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network such as the Internet via communication network 506. In such embodiments, user equipment devices may operate in a peer-to-peer manner without communicating with a central server.

User equipment device 508 may be a smartphone device or a user television equipment system or device. In some embodiments, microphone 529 may receive voice commands for the vehicle security application. In some embodiments, display 520 may be a television display or a computer display. In some embodiments, user input interface 518 may be a remote control device. In some embodiments, the circuit boards may include control circuitry, processing circuitry, and storage (e.g., RAM, ROM, hard disk, removable disk, etc.). In some embodiments, the circuit boards may include an input/output path. User equipment device 508 may receive content and data via input/output (I/O) path 528. I/O path 528 may provide content (e.g., broadcast programming, on-demand programming, Internet content, content available over a local area network (LAN) or wide area network (WAN), and/or other content) and data to control circuitry 526, which may comprise processing circuitry 524 and storage 522. Control circuitry 526 may be used to send and receive commands, requests, and other suitable data using I/O path 528, which may comprise I/O circuitry. I/O path 528 may connect control circuitry 526 (and specifically processing circuitry 524) to one or more communications paths (described below). I/O functions may be provided by one or more of these communications paths, but are shown as a single path in FIG. 5 to avoid overcomplicating the drawing.

Control circuitry 526 may be based on any suitable control circuitry such as processing circuitry 524. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 526 executes instructions for the vehicle security application stored in memory (e.g., storage 522). Specifically, control circuitry 526 (and/or control circuitry 532 of vehicle 530) may be instructed by the vehicle security application to perform the functions discussed above and below. In some implementations, processing or actions performed by control circuitry 526 may be based on instructions received from the vehicle security application.

In client/server-based embodiments, control circuitry 526 may include communications circuitry suitable for communicating with a vehicle security application server or other networks or servers. The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 522 that is part of control circuitry 526. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 522 may be used to store various types of content described herein as well as vehicle security application described above. Nonvolatile memory may also be used (e.g., to launch a boot-up routine and other instructions). Cloud-based storage, described in relation to FIG. 5, may be used to supplement storage 522 or instead of storage 522.

Control circuitry 526 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 526 may also include scaler circuitry for upconverting and downconverting content into the preferred output format of user equipment device 508. Control circuitry 526 may also include digital-to-analog converter circuitry and analog-to-digital converter circuitry for converting between digital and analog signals. The tuning and encoding circuitry may be used by user equipment device 508 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 522 is provided as a separate device from user equipment device 508, the tuning and encoding circuitry (including multiple tuners) may be associated with storage 522.

Control circuitry 526 may receive instruction from a user by way of user input interface 518. User input interface 518 may be any suitable user interface, such as a remote control, mouse, trackball, keypad, keyboard, touch screen, touchpad, stylus input, joystick, voice recognition interface, or other user input interfaces. Display 520 may be provided as a stand-alone device or integrated with other elements of each one of user equipment device 508. For example, display 520 may be a touchscreen or touch-sensitive display. In such circumstances, user input interface 518 may be integrated with or combined with display 512. Display 520 may be one or more of a monitor, a television, a display for a mobile device, or any other type of display. A video card or graphics card may generate the output to display 512. The video card may be any control circuitry described above in relation to control circuitry 526. The video card may be integrated with control circuitry 526. Speakers 516 may be provided as integrated with other elements of each one of user equipment device 508 or may be stand-alone units. The audio component of videos and other content displayed on display 520 may be played through the speakers 516. In some embodiments, the audio may be distributed to a receiver (not shown), which processes and outputs the audio via speakers 516.

The vehicle security application may be implemented using any suitable architecture. For example, it may be a stand-alone application wholly-implemented on vehicle 530 and/or user equipment device 508. In such an approach, instructions of the application are stored locally (e.g., in storage 522), and data for use by the application is downloaded on a periodic basis (e.g., from an out-of-band feed, from an Internet resource, or using another suitable approach). Control circuitry 526 may retrieve instructions of the application from storage 522 and process the instructions to provide supplemental content as discussed. Based on the processed instructions, control circuitry 526 may determine what action to perform when input is received from user input interface 518. For example, movement of a cursor on a display up/down may be indicated by the processed instructions when user input interface 518 indicates that an up/down button was selected.

In some embodiments, the vehicle security application is a client/server-based application. Data for use by a thick or thin client implemented on each one of user equipment device 508 is retrieved on-demand by issuing requests to a server remote to each one of user equipment device 508. In one example of a client/server-based guidance application, control circuitry 526 runs a web browser that interprets web pages provided by a remote server. For example, the remote server may store the instructions for the application in a storage device. The remote server may process the stored instructions using circuitry (e.g., control circuitry 511) to perform the operations discussed in connection with FIGS. 1-4.

In some embodiments, the vehicle security application may be downloaded and interpreted or otherwise run by an interpreter or virtual machine (e.g., run by control circuitry 532 and/or run by control circuitry 526). In some embodiments, the vehicle security application may be encoded in the ETV Binary Interchange Format (EBIF), received by control circuitry 532 and/or run by control circuitry 526 as part of a suitable feed, and interpreted by a user agent running on control circuitry 526. For example, the wireless vehicle security application may be an EBIF application. In some embodiments, the vehicle security application may be defined by a series of JAVA-based files that are received and run by a local virtual machine or other suitable middleware executed by control circuitry 532 and/or run by control circuitry 526. In some of such embodiments (e.g., those employing MPEG-2 or other digital media encoding schemes), the vehicle security application may be, for example, encoded and transmitted in an MPEG-2 object carousel with the MPEG audio and video packets of a program.

Figure 3:
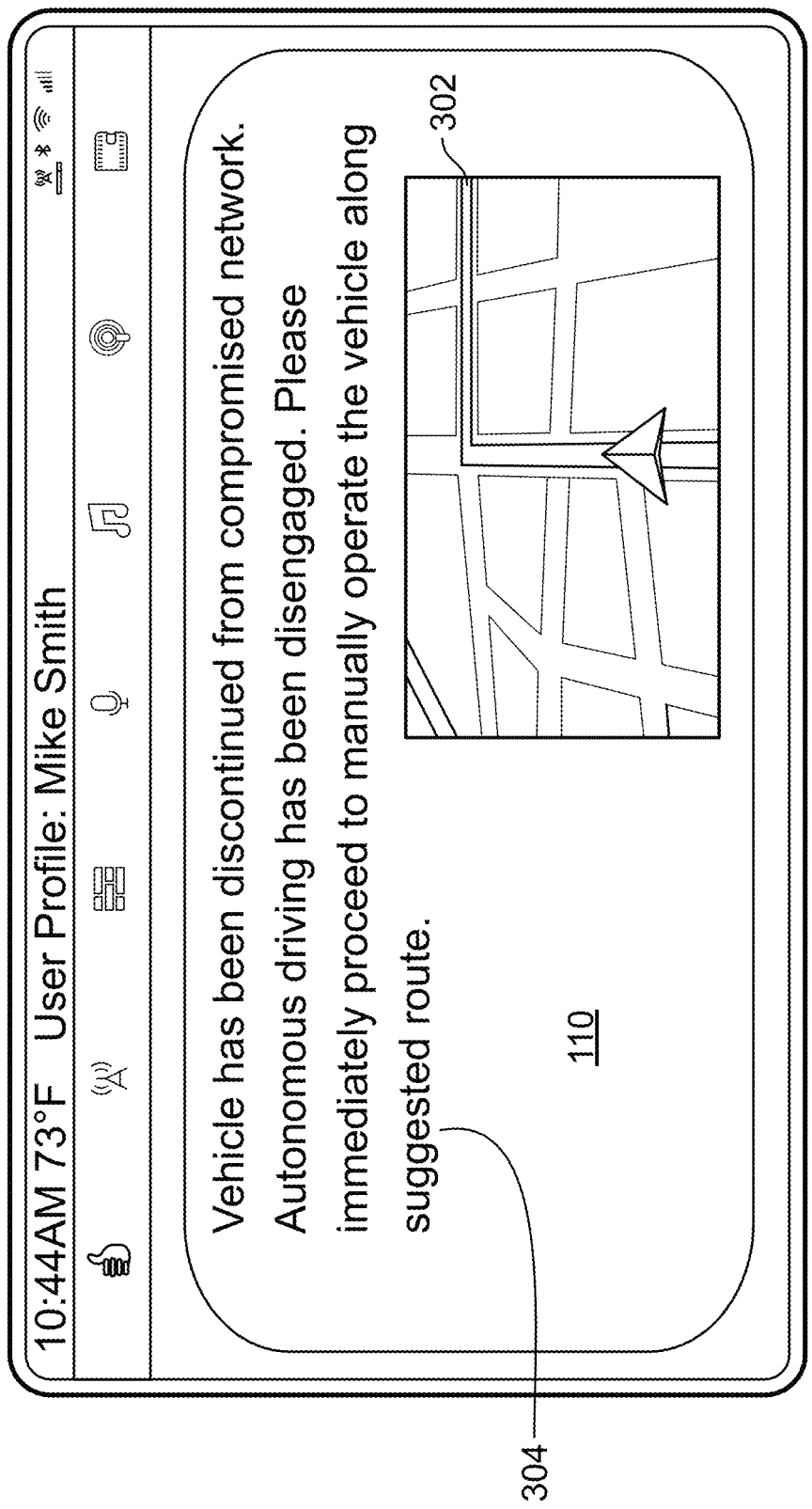
FIG. 3 shows an illustrative example of remedial action performed while a vehicle is disconnected from a compromised wireless network, in accordance with some embodiments of this disclosure.

System 500 may comprise one or more vehicles 530 (which may correspond to vehicles 100 of FIG. 1, vehicle 300 of FIG. 3). Vehicle 530 may comprise control circuitry 532, storage 534, communications circuitry 536, vehicle sensors 538, display 539, I/O circuitry 540, GPS module 542, speaker 544, and microphone 546. In some embodiments, control circuitry 532, storage 534, communications circuitry 536, display 539, I/O circuitry 540, speaker 544, and microphone 546 may be implemented in a similar manner as discussed in connection with corresponding components of server 504 and/or user equipment device 508. In some embodiments, communications circuitry 536 may be suitable for communicating with a vehicle security application server or other networks or servers or external devices (e.g., via one or more antennas provided on an exterior or interior of vehicle 530) In some embodiments, communications circuitry 536 may be included as part of control circuitry 532. In some embodiments, control circuitry 532 may be configured to disconnect vehicle 530 from network 500 in response to receiving selection of a selectable option (e.g., option 122 of FIG. 1), such as by disabling communications circuitry 536. In some embodiments, portions of communication circuitry 536 enabling communication over a first wireless network (e.g., Wi-Fi, which may be determined to be compromised) may be disabled while other portions of communication circuitry 536 enabling communications over a second wireless communication network (e.g., a short-range communication method) may be selectively be determined to remain enabled (e.g., to enable communications with external devices in remediating the network compromise). In some embodiments, display 539 may correspond to display 104 of FIG. 1.

In some embodiments, GPS module 542 may be in communication with one or more satellites or remote servers to enable vehicle 530 to provide upcoming directions, e.g., recited via speaker 544 and/or provided via display 539, to aid in vehicle navigation. In some embodiments, vehicle 530 is an autonomous vehicle capable of automatically navigating vehicle 530 along a route corresponding to the directions received via GPS module 542.

In some embodiments, vehicle sensors 538 may comprise one or more of proximity sensors, ultrasonic sensors, temperature sensors, accelerometers, gyroscopes, pressure sensors, humidity sensors, etc., and control circuitry 532 may monitor vehicle operations, such as navigation, powertrain, braking, battery, generator, climate control, and other vehicle systems. Such communication systems for exchanging information with external devices, networks, and systems, such as cellular, Wi-Fi, satellite, vehicle-to-vehicle communications, infrastructure communication systems, and other communications technologies. Such vehicle systems may acquire numerous data points per second, and from this data may identify or calculate numerous types of vehicle status data, such as location, navigation, environmental conditions, velocity, acceleration, change in altitude, direction, and angular velocity. In some embodiments, information collected by vehicle 530 may be utilized by vehicle 530 and/or transmitted to server 504 for use in performing autonomous or semi-autonomous navigation, as well as for use by the vehicle security application in determining whether a particular wireless network of vehicle 530 has been compromised.

Figure 6:
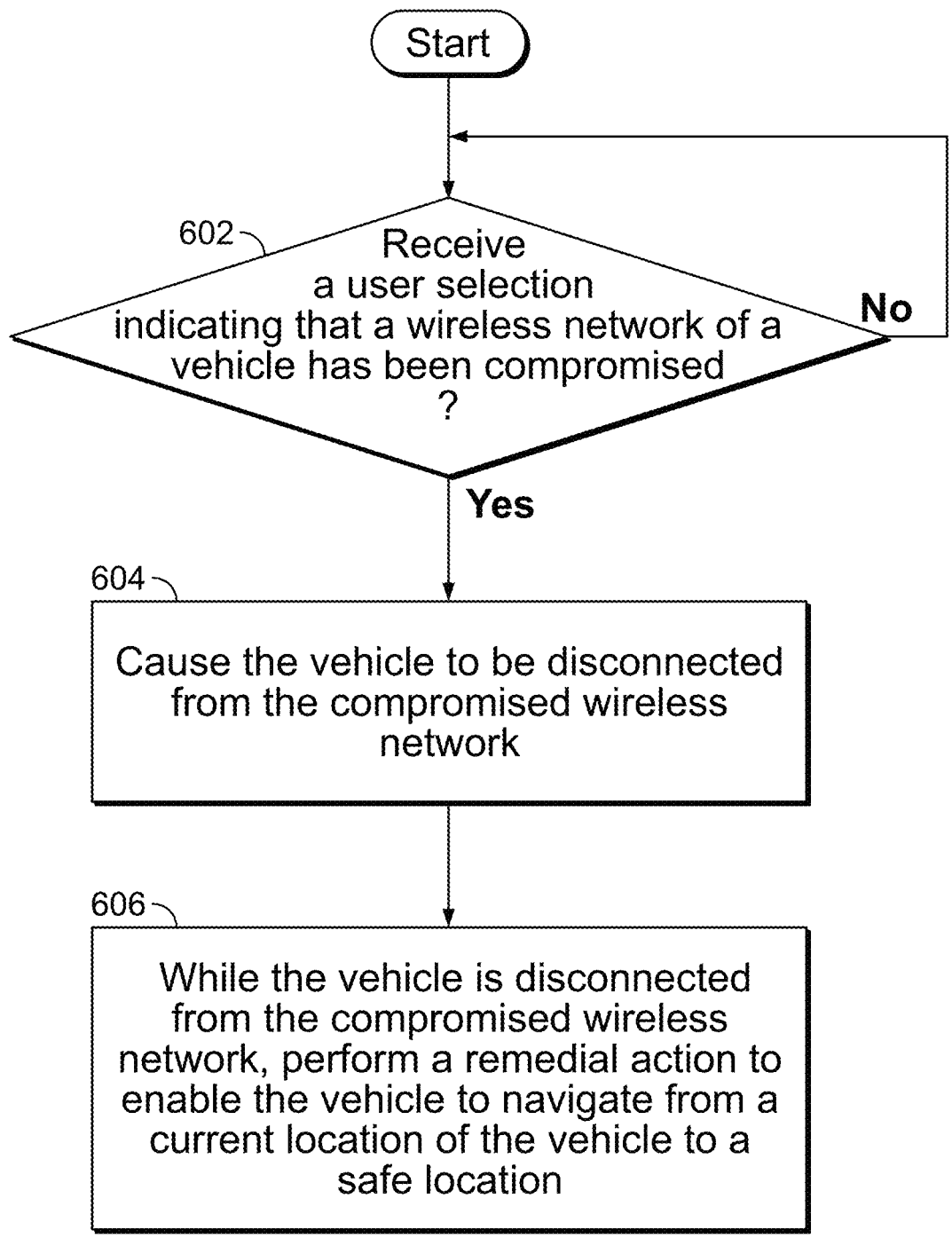
FIG. 6 is a flowchart of a detailed illustrative process for performing a remedial action while a vehicle is disconnected from a compromised wireless network, in accordance with some embodiments of this disclosure.

FIG. 6 is a flowchart of a detailed illustrative process for performing a remedial action while a vehicle is disconnected from a compromised wireless network, in accordance with some embodiments of this disclosure. In various embodiments, the individual steps of process 600 may be implemented by one or more components of the devices and systems of FIGS. 1-5. Although the present disclosure may describe certain steps of process 600 (and of other processes described herein) as being implemented by certain components of the devices and systems of FIGS. 1-5, this is for purposes of illustration only, and it should be understood that other components of the devices and systems of FIGS. 1-5 may implement those steps instead.

At 602, control circuitry (e.g., control circuitry 532 of vehicle 530 of FIG. 5 and/or control circuitry 511 of server 504 of FIG. 5) may determine whether a user selection has been received indicating that a wireless network of a vehicle (e.g., vehicle 100 of FIG. 1) has been compromised. For example, control circuitry 532 of vehicle 530 may determine whether a selection of option 122 of FIG. 1 has been received via user interface 110 or via any other suitable input (e.g., voice, tactile, remote control, text-based, etc.), and/or control circuitry 511 of server 504 may determine whether an indication from vehicle 530 has been received indicating that option 122 has been selected. In response to determining that the user selection has been received, processing may proceed to 604. Otherwise, the control circuitry may continue monitoring for such user selection. For example, option 122 may be selected where a user observes abnormal behavior in his or her vehicle, even if the vehicle is not providing any notifications to the user that one or more wireless networks of the vehicle are compromised.

At 604, the control circuitry may cause the vehicle (e.g., vehicle 100 of FIG. 1) to be disconnected from the compromised wireless network associated with the selection received at 602. If the vehicle is connected to only one wireless network at 602, the vehicle may be disconnected from such network. If the selectable option (e.g., option 122 of FIG. 1) specifies a particular network (e.g., Wi-Fi or cellular network), the vehicle may be disconnected from the particular network specified by such selectable option.

In some embodiments, if the vehicle is connected to multiple networks, the control circuitry may determine whether any of the multiple networks are likely to be compromised, such as by analyzing data packets received over each network, and determining whether network traffic is irregular as compared to normal network traffic conditions, where information concerning normal network traffic conditions may be stored at storage 534 of vehicle 530 and/or server 504. For example, if the control circuitry determines that network traffic over a particular wireless network is associated with an unusually high number of packets from a particular (e.g., unknown) address and/or an unusually large amount of outbound or inbound traffic, or that there is irregular header or payload information in such packets, that particular wireless network may be determined to be likely to be compromised. Conversely, if a particular wireless network is determined to be exhibiting normal network traffic conditions, such wireless network may be determined not to be compromised, and there may be no need to disconnect the vehicle (e.g., vehicle 100 of FIG. 1) from such normally functioning wireless network.

At 606, while the vehicle (e.g., vehicle 100 of FIG. 1) is disconnected from the compromised wireless network, the control circuitry may perform one or more remedial actions to enable the vehicle to navigate from a current location of the vehicle to a safe location. In some embodiments, the remedial action to be performed may be based on whether the vehicle is determined to currently be in a safe location (e.g., based on a last known location of the vehicle prior to disconnecting from the wireless network and/or based on an indication received from a mobile device of an occupant of the vehicle over an uncompromised wireless network link). If the vehicle is determined to be in a safe location (e.g., parked, or traveling off-road on flat terrain) the remedial action may comprise immobilizing the engine and notifying the user of the remedial action being taken. If the vehicle is determined not to be in a safe location (e.g., in the middle of highway traveling at a relatively fast speed) the remedial action may comprise enabling the vehicle to travel to a safe location.

In some embodiments, the remedial action to be performed to enable the vehicle to reach a safe location may depend on whether the vehicle remains connected to any other (uncompromised) wireless network and/or whether the vehicle is capable of autonomous operation and/or which data is locally stored by the vehicle and/or local processing capabilities of the vehicle. If the disconnection performed at 604 caused vehicle 100 to be disconnected from all wireless networks, the remedial action may comprise actions similar to those depicted in FIG. 2 (e.g., performing autonomous operation of the vehicle using local processing modules having been disconnected from the comprised network) or FIG. 3 (e.g., informing the occupant that he or she should take control of the vehicle to navigate the vehicle along the suggested route to a safe location). For example, certain navigation data received by the vehicle (e.g., GPS module 542 of vehicle 500) over communication networks may be cached in local memory of the vehicle (e.g., storage 534 of FIG. 5) for use once the vehicle is disconnected from the wireless network, and one or more automotive sensors (e.g., vehicle sensors 538) may locally process data concerning the surroundings of the vehicle to assist in the autonomous operation of the vehicle.

If the disconnection performed at 604 caused vehicle 100 to be disconnected from one wireless network, but the vehicle is determined to still be connected to an additional wireless network that is determined not to be compromised, the remedial action may leverage such additional wireless network to cause the vehicle to reach a safe location. For example, the remedial action depicted in FIGS. 2-3 may be performed, such as, for example, by communicating with the external devices or components as discussed in connection with FIG. 4.

Figure 7:
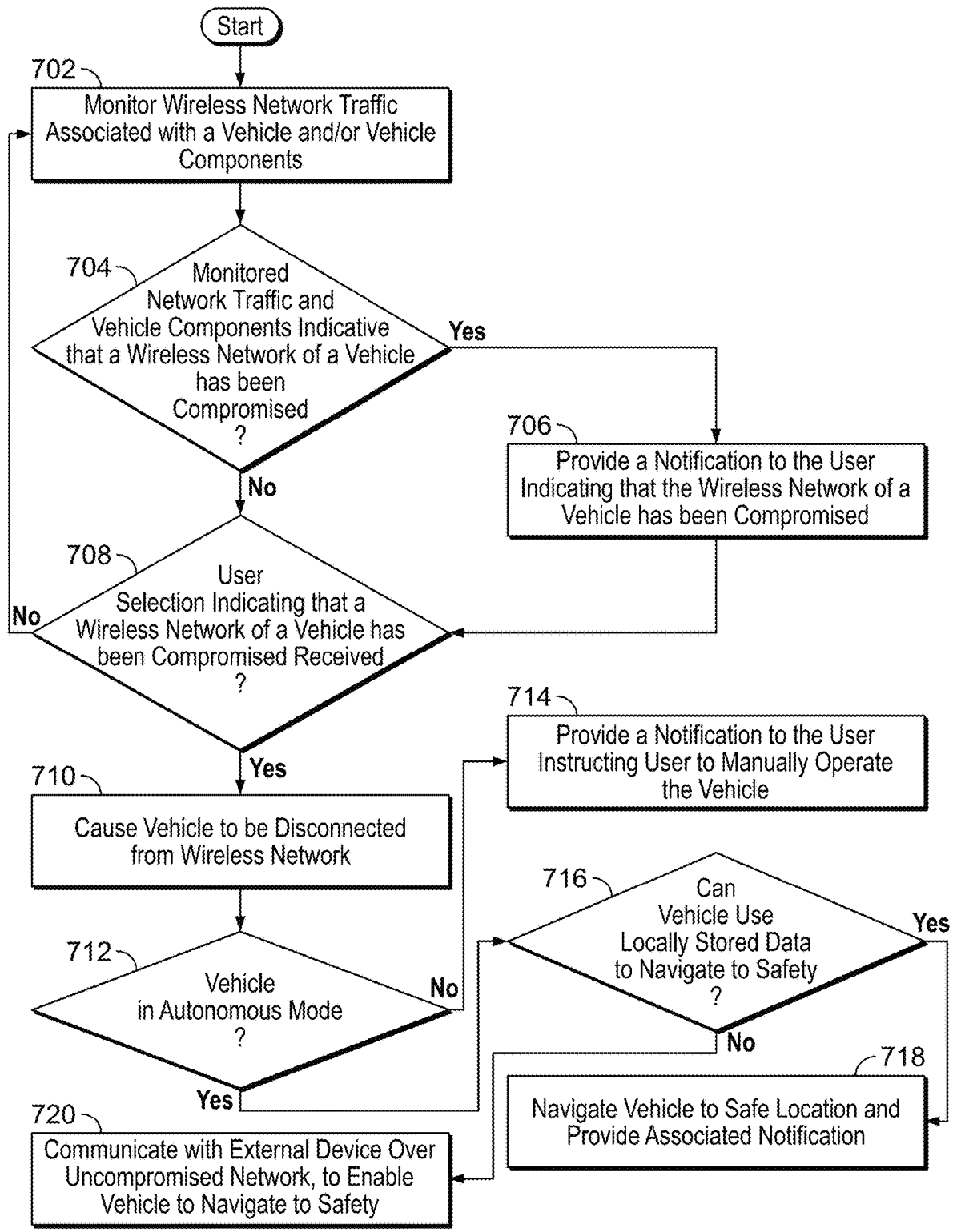
FIG. 7 is a flowchart of a detailed illustrative process for performing a remedial action while a vehicle is disconnected from a compromised wireless network, in accordance with some embodiments of this disclosure.

FIG. 7 is a flowchart of a detailed illustrative process for performing a remedial action while a vehicle is disconnected from a compromised wireless network, in accordance with some embodiments of this disclosure. In various embodiments, the individual steps of process 700 may be implemented by one or more components of the devices and systems of FIGS. 1-5. Although the present disclosure may describe certain steps of process 700 (and of other processes described herein) as being implemented by certain components of the devices and systems of FIGS. 1-5, this is for purposes of illustration only, and it should be understood that other components of the devices and systems of FIGS. 1-5 may implement those steps instead.

At 702, the control circuitry (e.g., control circuitry 532 of vehicle 530 of FIG. 5 and/or control circuitry 511 of server 504 of FIG. 5) may monitor wireless network traffic associated with the vehicle and may monitor vehicle components of a vehicle (e.g., vehicle 100 of FIG. 1). For example, the control circuitry may monitor behavior of, e.g., doors of the vehicle, infotainment system of the vehicle, HVAC system of the vehicle, etc., to determine whether one or more components are functioning abnormally. Additionally or alternately, the control circuitry may monitor wireless network traffic associated with one or more networks (e.g., cellular, satellite, Wi-Fi, short-range communication, etc.) that the vehicle is connected to.

At 704, the control circuitry may determine whether the monitored network traffic and vehicle components indicate that a wireless network of a vehicle has been compromised. For example, if the control circuitry determines that communications over a particular wireless network are associated with an unusually high number of packets from a particular (e.g., unknown) address and/or an unusually large amount of outbound or inbound traffic, or that there is irregular header or payload information in such packets, that particular wireless network may be determined to be likely to be compromised. Conversely, if a particular wireless network is determined to be exhibiting normal network traffic conditions, such wireless network may be determined not to be compromised and there may be no need to disconnect the vehicle from such normally functioning wireless network. Processing may proceed to 706 upon determining one or more wireless networks of the vehicle have been compromised. On the other hand, processing may proceed to 708 upon determining the one or more wireless networks of the vehicle have not been compromised. In some embodiments, processing may proceed to 706 even upon determining, at 704, the wireless network is not compromised.

At 706, the control circuitry may provide a notification (e.g., indicator 124 of user interface 110 of FIG. 1) to the user indicating that the wireless network of the vehicle has been compromised. In some embodiments, the notification may indicate that the wireless network of a vehicle has been compromised, based on the determination at 704.

At 708, the control circuitry may determine whether a user selection indicating that a wireless network of a vehicle has been compromised has been received. 708 may be performed in a similar manner to 602. The occupant of the vehicle may evaluate the notification provided at 706 and/or visually observe conditions of the vehicle in determining whether to initiate user selection of the option (e.g., option 122 of user interface 110 of FIG. 1). If no such user selection is received, processing may return to 702. If such user selection is received, processing may proceed to 710. In some embodiments, even if user selection of the option (e.g., option 122 of user interface 110 of FIG. 1) is not received, the control circuitry may automatically proceed to 710, e.g., if the control circuitry determines with a high confidence level that a particular vehicle network is compromised.

710 may be performed in a similar manner to 604 of FIG. 6, to disconnect the vehicle from one or more networks associated with a network compromise. At 712, the control circuitry may determine whether the vehicle is in an autonomous mode or is capable of operating in the autonomous mode. If so, processing may proceed to 716. Otherwise, processing may proceed to 714.

At 714, the control circuitry may provide a notification to the user instructing the user to manually operate the vehicle, e.g., notification 304 and/or route 302 of FIG. 3. In some embodiments, such notification may be provided even if the vehicle is capable of being in, or is in, an autonomous mode, e.g., since it may be preferable for the user to manually operate the vehicle in the absence of a wireless network connection, even if the vehicle is capable of operating autonomously.

At 716, the control circuitry may determine whether the vehicle (e.g., vehicle 530) is capable of utilizing locally stored data to navigate to safety. For example, control circuitry 532 of vehicle 530 may be disconnected from any wireless network connection, and may check whether locally stored data (e.g., cached navigation data and/or stored data to assist in identifying objects along the navigation route and performing appropriate navigation based on the identified objects) and local computing modules are sufficiently present at the vehicle to facilitate autonomous navigation of the vehicle, as shown in connection with FIG. 2. Upon determining the vehicle is capable of utilizing the local processing to navigate to a safe location, processing may proceed to 718. Otherwise, processing may proceed to 720.

At 718, the control circuitry may utilize locally stored data and local computing modules to facilitate autonomous navigation of the vehicle, as shown in connection with FIG. 2. In some embodiments, such local processing and locally stored data may be utilized in connection with 714, e.g., to provide navigation route 302 of FIG. 3.

At 720, the control circuitry may communicate with one or more external devices (e.g., vehicle 404 and landmarks 406, 408, 410, 412, 414 of FIG. 4) over a network determined to be an uncompromised wireless network, to enable vehicle to navigate to safety. For example, vehicle 400, at which the user selection of 708 may have been received, may be configured to communicate with vehicle 404 over short-range communication (e.g., utilizing wireless signals 416 of FIG. 4 to broadcast an SOS message for assistance, and wireless signals 418 to receive navigation instructions and/or navigation data), to receive navigation data from vehicle 404, and/or to enable vehicle 404 to remotely control vehicle 400 to cause vehicle 400 to reach a safe location. In some embodiments, the control circuitry may reconnect the disconnected network once the vehicle is in a safe location and upon determining that the disconnected network is once again secure, and/or in response to receiving input from the user indicating the wireless network is again secure (e.g., reselection of option 122).

What is claimed is:

1. A method comprising:
    determining that a wireless network of a vehicle has been compromised based on inbound signals from an external network causing an unexpected change in a functionality of the vehicle;
    based on the unexpected change in the functionality of the vehicle, providing a notification to the user indicating that the wireless network of the vehicle has been compromised;
    receiving a user selection indicating that the wireless network of the vehicle has been compromised;
    in response to receiving the user selection, causing the vehicle to be disconnected from the compromised wireless network;
    selecting a different network other than the compromised wireless network;
    communicating, over the different network, with a network-connected device within a predefined vicinity of the vehicle to notify the network-connected device that the wireless network of the vehicle has been compromised;
    while the vehicle is disconnected from the compromised wireless network:
    performing a remedial action to enable the vehicle to navigate from a current location of the vehicle to a safe location;
    wherein performing the remedial action comprises: causing, using control circuitry disconnected from the compromised wireless network, the vehicle to navigate from the current location of to the safe location based on instructions received from the network-connected device, and
    wherein communicating, over the different network than the compromised wireless network, with the network-connected device is performed based on a user profile of a user positioned within the vehicle.

2. The method of claim 1, wherein the user selection corresponds to receiving input associated with a physical switch positioned in the vehicle.

3. The method of claim 1, wherein the user selection corresponds to receiving input associated with a graphical user interface of the vehicle or a graphical user interface of a user device.

4. The method of claim 1, wherein performing the remedial action comprises:
    determining, using locally stored navigation data, a driving route from the current location of the vehicle to the safe location; and
    causing, using control circuitry disconnected from the compromised wireless network, the vehicle to travel along the determined driving route from the current location to the safe location.

5. The method of claim 1, wherein:
    the compromised wireless network is one of a plurality of networks associated with the vehicle; and
    communicating, over the different network than the compromised wireless network, with the network-connected device comprises:
    performing the communicating with the network-connected device over the identified network;
    wherein selecting the network other than the compromised wireless network comprises:
    identifying a network of the plurality of networks that is determined, based on a comparison of network traffic conditions of the network with normal network traffic conditions, to be unlikely to be compromised.

6. The method of claim 1, wherein communicating, over the different network than the compromised wireless network, with the network-connected device is performed with another vehicle.

7. The method of claim 1, wherein:
the vehicle is in an autonomous driving mode; and
performing the remedial action comprises generating for presentation a notification instructing a user to manually operate the vehicle.

8. The method of claim 1, wherein the functionality of the vehicle relates to a navigational system of the vehicle, and wherein the unexpected change includes the navigational system ceasing to function.

9. A system comprising:
input/output circuitry configured to:
receive a user selection indicating that a wireless network of a vehicle has been compromised; and
communicate with a network-connected device within a predefined vicinity of the vehicle to notify the network-connected device that the wireless network of the vehicle has been compromised;
control circuitry configured to:
determine that the wireless network of the vehicle has been compromised based on inbound signals from an external network causing an unexpected change in a functionality of the vehicle;
based on the unexpected change in the functionality of the vehicle, provide a notification to the user indicating that the wireless network of the vehicle has been compromised;
select a different network other than the compromised wireless network, wherein the input/output circuitry is configured to communicate with the network-connected device using selected different network;
in response to receiving the user selection, cause the vehicle to be disconnected from the compromised wireless network; and
while the vehicle is disconnected from the compromised wireless network:
perform a remedial action to enable the vehicle to navigate from a current location of the vehicle to a safe location;
wherein the control circuitry is configured to perform the remedial action by causing, using control circuitry disconnected from the compromised wireless network, the vehicle to navigate from the current location of to the safe location based on instructions received from the network-connected device, and
wherein the control circuitry is configured to communicate, over the different network than the compromised wireless network, with the network-connected device based on a user profile of a user positioned within the vehicle.

10. The system of claim 9, wherein the user selection corresponds to receiving input associated with a physical switch positioned in the vehicle.

11. The system of claim 9, wherein the user selection corresponds to receiving input associated with a graphical user interface of the vehicle or a graphical user interface of a user device.

12. The system of claim 9, wherein the control circuitry is configured to perform the remedial action by:
determining, using locally stored navigation data, a driving route from the current location of the vehicle to the safe location; and
causing, using control circuitry disconnected from the compromised wireless network, the vehicle to travel along the determined driving route from the current location to the safe location.

13. The system of claim 9, wherein:
the compromised wireless network is one of a plurality of networks associated with the vehicle; and
the control circuitry is configured to communicate, over the different network than the compromised wireless network, with the network-connected device by:
performing the communicating with the network-connected device over the identified network;
wherein selecting the network other than the compromised wireless network comprises:
identifying a network of the plurality of networks that is determined, based on a comparison of network traffic conditions of the network with normal network traffic conditions, to be unlikely to be compromised.

14. The system of claim 9, wherein the network-connected device is another vehicle.

15. The system of claim 9, wherein:
the vehicle is in an autonomous driving mode; and
wherein the control circuitry is further configured to perform the remedial action by generating for presentation a notification instructing a user to manually operate the vehicle.

16. The system of claim 11, wherein the functionality of the vehicle relates to a navigational system of the vehicle, and wherein the unexpected change includes the navigational system ceasing to function.

* * * * *